(12) United States Patent
Hobson

(10) Patent No.: US 11,052,274 B2
(45) Date of Patent: Jul. 6, 2021

(54) METHOD AND APPARATUS FOR EXERCISE ENERGY UTILIZATION

(71) Applicant: Charlton Michael Hobson, Gaithersburg, MD (US)

(72) Inventor: Charlton Michael Hobson, Gaithersburg, MD (US)

(*) Notice: Subject to any disclaimer, the term of this patent is extended or adjusted under 35 U.S.C. 154(b) by 164 days.

(21) Appl. No.: 15/653,116

(22) Filed: Jul. 18, 2017

(65) Prior Publication Data
US 2019/0027957 A1    Jan. 24, 2019

(51) Int. Cl.
*H04L 29/08* (2006.01)
*B60L 50/20* (2019.01)
(Continued)

(52) U.S. Cl.
CPC ...... *A63B 21/0055* (2015.10); *A63B 21/0054* (2015.10); *A63B 22/001* (2013.01); *A63B 22/04* (2013.01); *A63B 22/0605* (2013.01); *A63B 22/0664* (2013.01); *B60L 1/006* (2013.01); *B60L 50/20* (2019.02); *B60L 53/22* (2019.02); *B60L 55/00* (2019.02); *H02J 7/1423* (2013.01); *H02J 7/32* (2013.01); *H04L 67/12* (2013.01); *B60L 2200/12* (2013.01); *B60L 2240/70* (2013.01); *B62J 43/00* (2020.02); *B62M 6/90* (2013.01); *F24F 11/30* (2018.01); *F24F 2110/10* (2018.01); *F24F 2110/20* (2018.01); *F24F 2120/10* (2018.01);
(Continued)

(58) Field of Classification Search
CPC ......... H02J 7/1407; H02J 7/32; H02J 7/1423; H02J 7/143; B60L 2240/70; B60L 2200/12; B60L 53/22; B60L 55/00; B60L 50/20; B60L 1/006; A63B 22/001; A63B 22/0605; A63B 22/0664; A63B 22/04; H04L 67/12; B62J 43/00; F24F 2110/20; F24F 2120/10; F24F 11/30; F24F 2110/10; F24F 2120/14; H02K 99/10; B62M 6/90; Y04S 10/126; Y02T 90/14; Y02T 10/7072; Y02T 10/70; Y02T 90/16; Y02T 10/64; Y02T 10/72
See application file for complete search history.

(56) References Cited

U.S. PATENT DOCUMENTS 6,229,224 B1 * 5/2001 Gagne ............... A63B 21/0053
                                                        290/1 A
7,967,734 B1 * 6/2011 Damian ............ A63B 21/0053
                                                        482/2
(Continued)

*Primary Examiner* — Sundhara M Ganesan
(74) *Attorney, Agent, or Firm* — Gibraltar Consulting LLC; Tariq S. Najee-ullah

(57) ABSTRACT

A system for capture, storage, and usage of electric energy generated by humans during exercise activities, including exercise devices having a modular control-power storage unit that incorporates energy conversion units arranged to transform mechanical energy of the at least one human participant into different storable forms of energy, at least one energy storage module arranged to store energy in at least one storage medium, and at least one control unit arranged to provide digital or analog control for the at least one modular control-power storage unit. The system may also have a communication and networking subsystem structured as a networking device and arranged to connect to and communicate bay exchanging information with at wired and/or wireless network.

19 Claims, 3 Drawing Sheets

(51) Int. Cl.
    *H02K 99/00* (2014.01)
    *F24F 110/20* (2018.01)
    *F24F 120/10* (2018.01)
    *F24F 11/30* (2018.01)
    *F24F 110/10* (2018.01)
    *F24F 120/14* (2018.01)
    *A63B 22/00* (2006.01)
    *A63B 22/06* (2006.01)
    *A63B 22/04* (2006.01)
    *A63B 21/005* (2006.01)
    *H02J 7/14* (2006.01)
    *B60L 53/22* (2019.01)
    *B60L 55/00* (2019.01)
    *H02J 7/32* (2006.01)
    *B60L 1/00* (2006.01)
    *B62M 6/90* (2010.01)
    *B62J 43/00* (2020.01)

(52) U.S. Cl.
    CPC .......... *F24F 2120/14* (2018.01); *H02J 7/143* (2020.01); *H02J 7/1407* (2013.01); *H02K 99/10* (2016.11)

(56) References Cited

U.S. PATENT DOCUMENTS

| | | | |
|---|---|---|---|
| 8,888,660 B1* | 11/2014 | Oteman | A63B 21/005 482/1 |
| 9,764,178 B1* | 9/2017 | Wein | A63B 21/0055 |
| 2007/0252453 A1* | 11/2007 | Vasilovich | A63B 21/0053 310/68 A |
| 2008/0172328 A1* | 7/2008 | Ajilian | G06Q 20/10 705/39 |
| 2009/0247366 A1* | 10/2009 | Frumer | A63B 21/005 482/2 |
| 2009/0251296 A1* | 10/2009 | Whelan, Jr. | A63B 21/0053 340/10.51 |
| 2009/0280960 A1* | 11/2009 | Tian | A63B 21/0053 482/2 |
| 2010/0197460 A1* | 8/2010 | Czarnecki | A63B 22/0605 482/2 |
| 2010/0230976 A1* | 9/2010 | Chou | A63B 21/0053 290/1 C |
| 2011/0234175 A1* | 9/2011 | Hajee | A63B 21/0053 320/164 |
| 2012/0208675 A1* | 8/2012 | Hu | A63B 71/0622 482/2 |
| 2012/0217758 A1* | 8/2012 | Chen | A63B 21/0053 290/1 C |
| 2013/0005533 A1* | 1/2013 | Al | A63B 22/0242 482/2 |
| 2013/0123068 A1* | 5/2013 | Sultan | A63B 24/0062 482/2 |
| 2013/0172150 A1* | 7/2013 | Bruno | A63B 71/0619 482/2 |
| 2014/0077494 A1* | 3/2014 | Sutkowski | A63B 21/0053 290/7 |
| 2014/0194257 A1* | 7/2014 | Ceysens | A63B 21/0053 482/63 |
| 2014/0265334 A1* | 9/2014 | Reitman | H02J 7/14 290/50 |
| 2014/0296033 A1* | 10/2014 | Frumer | A63B 21/0053 482/2 |
| 2016/0089992 A1* | 3/2016 | Le | H02J 7/0003 320/107 |
| 2017/0043670 A1* | 2/2017 | Zenner et al. | B60L 11/1822 |
| 2017/0288503 A1* | 10/2017 | Lee | H02K 7/1861 |

* cited by examiner

METHOD AND APPARATUS FOR EXERCISE ENERGY UTILIZATION

FIELD OF THE INVENTION

The current invention, in general sense, relates to fields of personal exercise equipment and production and usage of human-generated electric energy. The current invention may be practiced indoor or outdoor while exercising or using energy stored during the exercise and recreation processes and activities. In different embodiments, apparatuses and methods of the instant invention may be of interest in the situation when other energy sources may not be readily available including emergencies, natural and social disasters, accidents, outdoor survival scenarios and similar events. More particularly, the current invention pertains to human-powered exercise and sport equipment arranged to utilize energy generated by participants during the exercise and sport activities for contemporaneous or subsequent uses and conveniences.

BACKGROUND OF THE INVENTION

The popularity of purpose-designed exercise equipment and versatility of such have increased over the last few years. In particular, popularity of exercise bikes driven in part by the attraction of so called "spinning" classes—group cycling classes offered by many gyms targeted, at least in part to an aging segment of exercising population interested in relatively lower-impact forms of exercise. Consequently, trends in, for example, stationary bike models include ever-increasing choice of features in appearances and functionalities, going significantly beyond counting miles and tracking speed to having multiple programs that manage and change exercise pace, count calories burned, and measure heart rate. A significant portion of contemporary exercise bikes goes beyond connectivity to the Internet, allowing users to maintain an online record of exercise sessions to chart progress. Such devices may offer real device-to-device connectivity characteristic for the "Machine-to-Machine" (M2M), "Internet of Things" (IoT), and/or "Smart Fitness" concepts and trends.

Although, the features of the embodiments of the current inventions are predominantly exemplified in descriptions and illustrations of different exercise bikes mostly for indoor use, it may be noted that in different embodiments, different exercise concepts including, but not limited to, usage of treadmills, elliptical, rowing machines, steppers and climbing machines, indoor skiers and ski simulators should be considered by practitioners. It may be also noted that separate classes of embodiments may incorporate outdoor applications utilizing outdoor equipment comprising bicycles, tricycles, roller skates, roller blades, skate shoes, skateboards, strollers, pull or push carts, and combinations of above equipment and underlying concepts.

In general, exercise bikes (both stationary and mobile) may be classified as upright and recumbent, based upon intended positions of users. An upright exercise bike may be closely related to the predominant form of road bikes, with a predominantly vertical orientation of users ("riders") and handlebars substantially in front of the rider. On a recumbent bike, users may be seated against a backrest, with legs out in front. Practitioners may differ about the comparative utility and health benefits of upright versus recumbent models, but significant portion may agree, at least in the case of stationary exercise bikes, that selection may be a matter of particular circumstances and personal taste. For back pain patients it may depend on comfort while in a leaning forward position sitting on an upright stationary bike, or in a reclining position on a recumbent bike. It may be a matter of design choice to design, arrange, or adapt either upright or recumbent bikes in accordance with the different embodiments of the present Application.

SUMMARY OF THE INVENTION

A system for capture, storage, and usage of electric energy generated by human participants in exercise activities having: at least one exercise devices incorporating at least one energy conversion unit arranged to transform mechanical energy of the at least one human participant into different storable forms of energy, at least one energy storage module arranged to store energy in at least one storage medium, and at least one control unit arranged to provide digital or analog control for the at least one modular control-power storage unit. Thy system further incorporates at least one communication and networking subsystem structured as a networking device and arranged to connect to and communicate bay exchanging information with at wired and/or wireless network, and at least one environmental control unit enabled to maintain working conditions in operating ranges of the at least one modular control-power storage unit, the at least one modular control-power storage, and the at least one communication and networking subsystem.

BRIEF DESCRIPTION OF THE DRAWINGS

The above and other embodiments, features, and aspects of the present invention are considered in more detail in relation to the following description of embodiments shown in the accompanying drawings, in which.

DESCRIPTION OF SEVERAL EMBODIMENTS OF THE INVENTION

The current invention may be better understood by referring to the following description, which should be read in conjunction with the accompanying drawings of particular exemplary embodiments. This description of the illustrated embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also understand that such equivalent assemblies do not depart from the spirit and scope of the invention in its broadest form.

Figure 1:
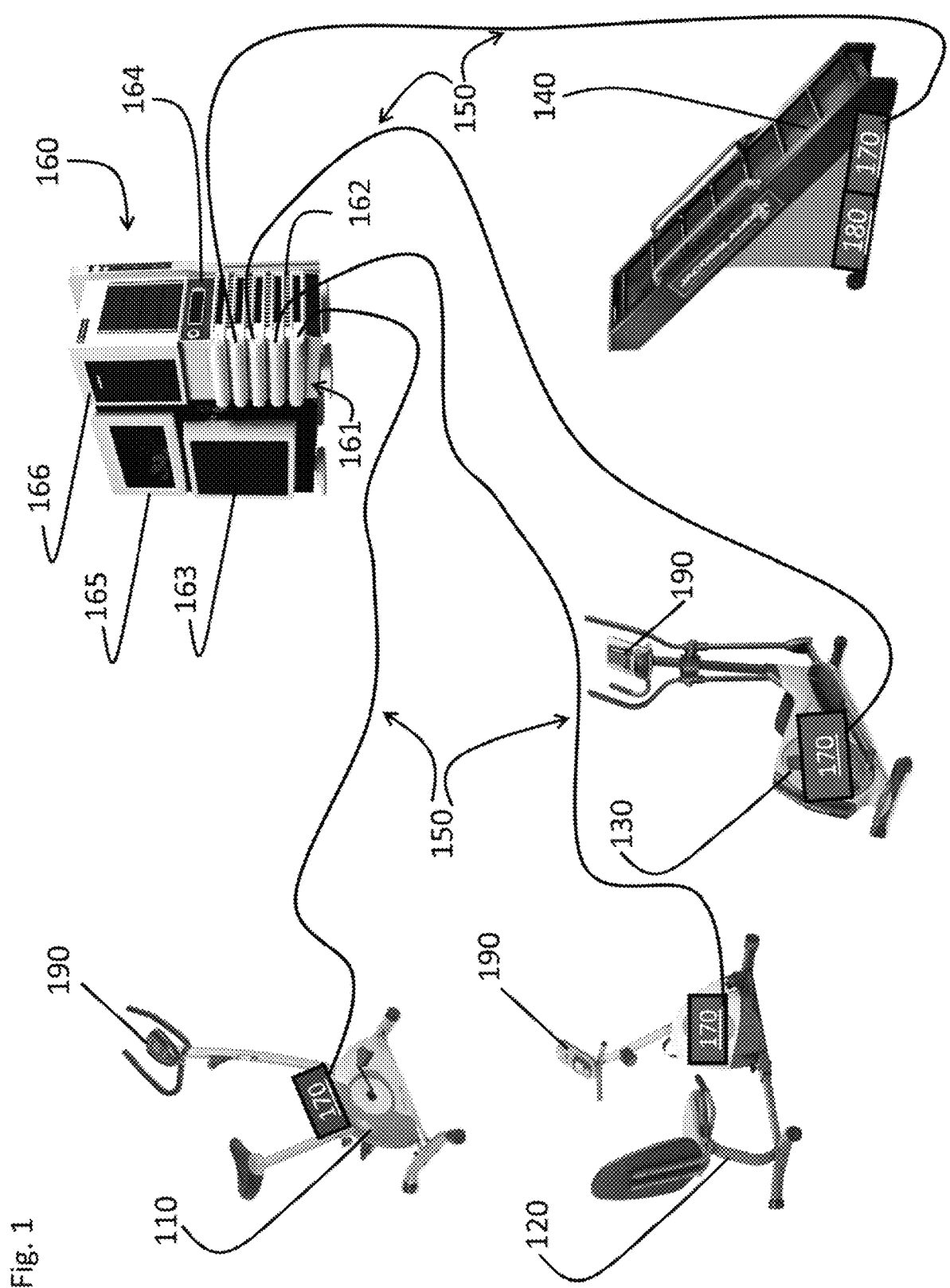
FIG. 1 is a schematic illustration of an embodiment in accordance with the current invention.

A simplified schematic representation of one of many possible embodiments of the current invention has been illustrated in FIG. 1. Several stationary exercise devices including upright exercise bike 110 (e.g. Stamina Magnetic Upright 1300 Upright Exercise Bike), recumbent exercise bike 120 (e.g. Weslo Pursuit CT 3.8 R Recumbent Exercise Bike), elliptical 130 (e.g. ProForm 6.0 ZE Elliptical; all available commercially by web orders or in-stores like Kmart subsidiary of Sears Holdings Corp.) and/or cardio exercise ladder 140 (e.g. Jacob's Ladder 2 available at www.gymsource.com (Jun. 6, 2016) or directly from Jacobs Ladder, LLC, 6292 Walmore Road, Niagara Falls, N.Y.) may be connected via data/power couplers 150 to one or more modular control-power storage units 160.

At least one modular control-power storage units 160 may be housed in a commercial housing such are housings available, for example, from Xoxide of Scottsdale, Az. It may incorporate one or more connector modules 161 arranged to incorporate power/data receptacles 162 (e.g. compliant to the Universal Serial Bus (USB) standard) enabled to charge external electronic devices and/or connect and communicate digital information.

The modular control-power storage units 160 may also incorporate at least one energy storage module 163 arranged to store energy in at least one storage medium, including but not limited to rechargeable batteries, capacitor batteries, mechanical fly wheels, energetic chemical compounds, pressurized fluid devices, elastic and elastomeric energy storage units, and/or combination of above. One practical embodiment of the current invention may utilize commercial electric battery assembly such is the GreenWorks G-MAX 40V Li-Ion 2 AH Battery originally intended for gardening and yard work equipment.

In a different embodiment, the at least one energy storage module may incorporate charging stations for various devices that may include internal rechargeable battery assemblies. One particular class of charging stations for smart cellular phones and portable communication devices may be represented by commercial CASE Cruiser® Charging Stations for Apple iPads and Chromebook® (available from Acer®, Asus®, HP®, Samsung® and several other manufacturers). In such embodiments, the modular control-power storage units 160 and/or the at least one energy storage module 163 may also incorporate at least one auxiliary power supply connectable to the electric power greed and arranged to have at least one AC to DC converter to provide additional charging and/or charged state maintenance.

In addition, the modular control-power storage units 160 may be equipped with at least one control unit 164 arranged to provide digital or analog control functionality for the energy storage module 163. Also, the modular control-power storage units 160 may be equipped with at least one and connectivity, communication and networking subsystems 165. The communication and networking subsystem 165 may be arranged as a wired and/or wireless networking device also functioning as a wired or wireless network modem, hub, bridge or switch, router, cellular connectivity device, and/or short-link radio ("Bluetooth") wireless network device. In addition to above or it's combinations, the communication and networking subsystem 150 may be structured as an element of broader IoT networking system integrating all network-related components of the current invention in an expendable "Internet of Things" structure.

The at least one energy storage module 163 of one particular class of embodiments may incorporate connectors and other features facilitating modular usage. In such embodiments, at least some of the energy storage modules (and/or portions and subsections of such) may be arranged for convenient ("quick") manual disconnection and unplugging (using substantially no tools or dedicated devices). For example, single rechargeable electric cell or a predetermined assembly of cells may be, after recharging to a predetermined level, disconnected and removed (with or without replacement by similar devices) and used separately to power other electric appliances and/or systems.

In other embodiments, the modular control-power storage units 160 may incorporate at least one environmental, control unit 166 structured and enabled to provide suitable working conditions to the other components of the disclosed system, as well as ventilation, culling, heating, air-conditioning, air humidity control, air filtration, olfactory stimuli adjustment, positive and negative air ion concentrations maintenance, combination of the above environmental control functions, and other environmental parameters and conditions pertinent to the well-being and comfort of human participants and practitioners.

The stationary exercise devices 110-140 of the current invention may incorporate at least one energy conversion unit 170 arranged to convert mechanical energy of human participants into other storable forms of energy. In one class of embodiments the at least one energy conversion unit may incorporate generators arranged for human powering commercially available from K-TOR®, LLC of Clayton, N.C. The above generators known colloquially as "power boxes" may be incorporated into the exercise devices either as replacements for the human interfacing parts of the original devices (i.e. pedals and fly wheels, steps and connecting subsystems etc.) or may be coupled (either externally or internally) to the existing mechanical subsystem using mechanical (e.g. friction-based) kinetic couplers and torque transducers (rollers, belts, chains, pulleys, gears, friction discs, and combinations), fluid-based pneumatic or hydraulic couplers, and/or magnetic and electromagnetic couplers.

In addition at least a portion of the stationary exercise devices 110-140 may incorporate separate electronic subsystems 180 arranged to essentially independently (e.g. separate from the modular control-power storage units 160) store and/or communicate information pertinent to the function and utilization of the particular device (e.g. the cardio exercise ladder 140). Also, at least a portion of the stationary exercise devices 110-140 may incorporate a dedicated display unit 190 arranged to display data (such are activity log, exercise time, temperature, vital measurements including pulse, calories burn, and combinations). The display unit 190 may also include some local control functions like data inputs, communication requests, emergency messaging and similar.

Figure 2:
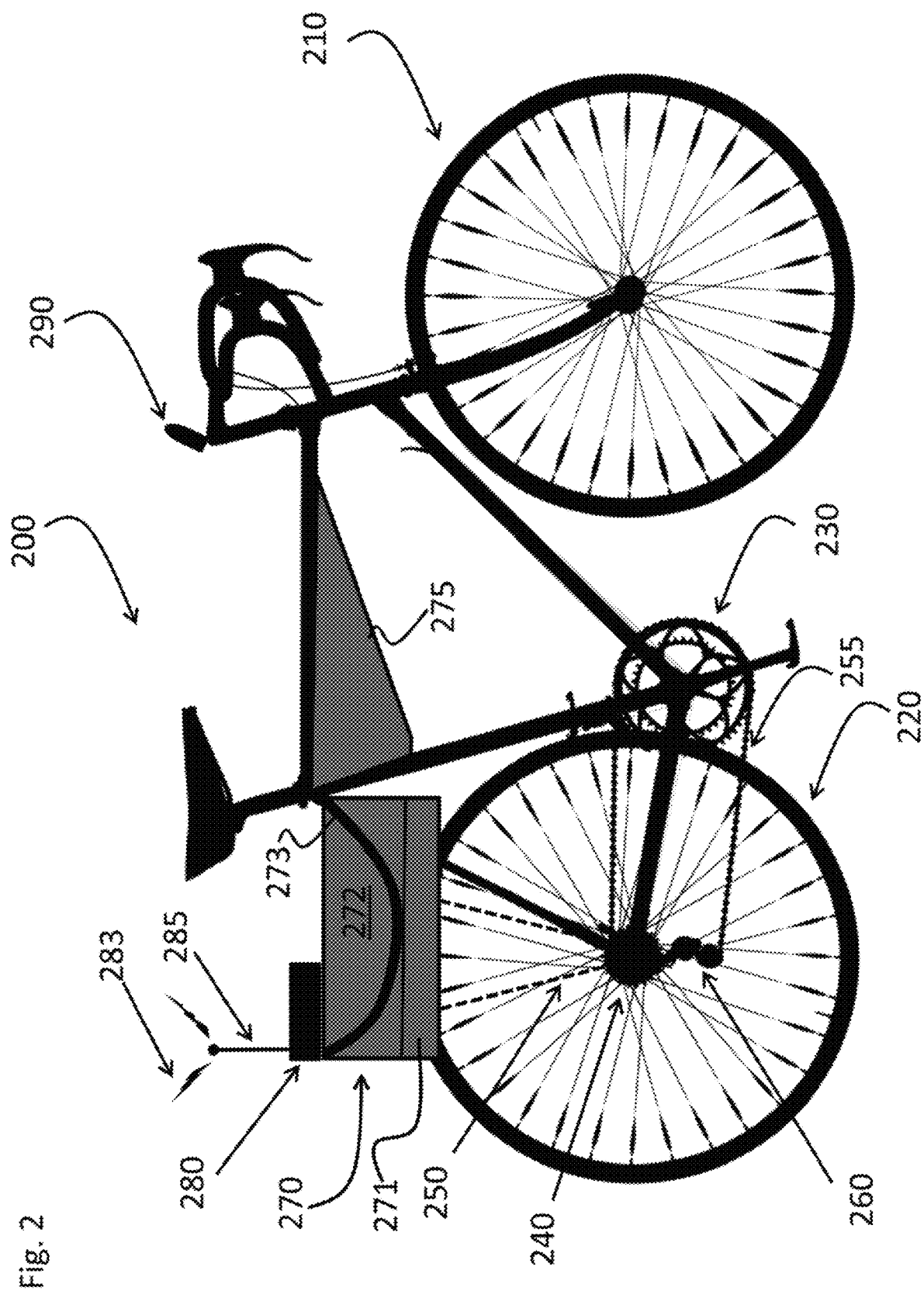
FIG. 2 is a schematic illustration of another embodiment in accordance with the current invention.

A different class of embodiments of the present invention pertaining to at least one mobile exercise equipment 200, including, but not limited to the mobile devices as listed above, have been illustrated in FIG. 2 using a generic road bicycle as the representative mobile exercise system concept. In these embodiments at least one modular control-power storage unit 160 and the at least one energy conversion unit 170 have been integrated in at least one modular power unit 270. The modular power unit 270 may be arranged to couple, e.g. via at least one coupling module 271, with rotatable components of the at least one mobile exercise equipment 200, for example using friction rollers directly coupled to the appropriate rotating parts (e.g. bike whiles 210 and 220) and/or be mechanically coupled indirectly to a power input gear system 230 or a speed control gear system 240. Such coupling may be arranged using an auxiliary chain unit coupled, for example to a preselected gear while of the speed control gear system 240. This arrangement may be enhanced by prearranging a speed control mechanism 260 in such manner that the primary chain drive 255 has been prevented (e.g. using limiters) to engage the preselected gear while.

In addition, the modular power unit 270 may incorporate one or more energy storage modules 272, functionally connected to the least one coupling module 271, and arranged for energy storage functions.

Furthermore, the modular power unit 270 may be arranged for efficient removal from, the mobile exercise equipment 200 and transported, for example using strap harness 273 to a location where the stored energy may be conveniently utilized for power-grid-independent operations of electronic devices, for example.

Even further, in another class of embodiments pertinent to relatively smaller and lighter (e.g. relative to standard bicycles) versions of mobile exercise equipment 200, modules 271 and 272 of the modular power unit 270 may be physically separated such that the at least one coupling module 271 may be attached directly to the at least one mobile exercise equipment 200, while the energy storage module 272 may be associated with and attached to a user (e.g. using harness 273), for example in a form of power pack attachable to the user's back as a backpack and/or to the users waist as a waist bag. It may be also noted that the control subsystem: may be associated, depending on the embodiments, with the coupling module 271, energy storage module, functionally divided between such, or arranged separately for convenience of observation and/or command and control input.

It may be also noted that different embodiments may incorporate at least one firmly attached power storage unit 275 which may be integrated into the mechanical (or other functional) structures of the mobile exercise equipment 200. In addition, at least one mobile display unit 290 may be added to monitor the status and functions of the mobile exercise equipment 200 in addition to control and command over at least one mobile communication module 280 arranged to communicate with the remote parties, for example, using electromagnetic signals 283 emitted by an antenna 285.

Figure 3:
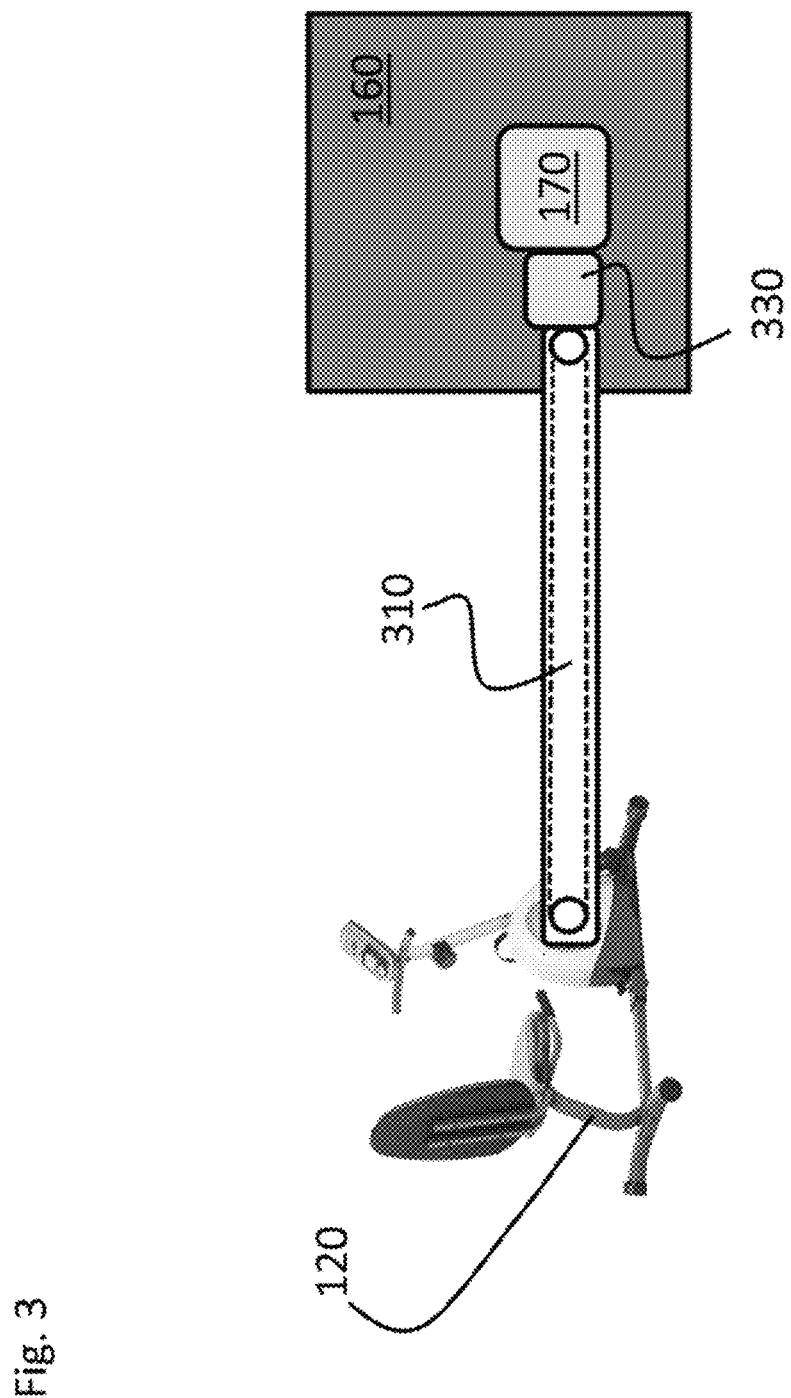
FIG. 3 is another schematic illustration of one different embodiment in accordance with the current invention.

Yet another embodiment of an apparatus in accordance with the current invention of particular interest has been illustrated schematically in FIG. 3. In such embodiments the at least one energy conversion unit 170 has been incorporated in the modular control-power storage units 160 and mechanically coupled with the exercise device (e.g. in the form of recumbent exercise bike 120) via at least one mechanical connector 310 (here schematically illustrated as a conventional chain and sprocket assembly). It may be immediately clear to practitioners that other forms of mechanical coupling based on, but not limited to, friction discs and whiles, belt and pulley, driving shaft and axles, torque couplers, and combinations of the above, may be also used.

In some subclasses of the above embodiments, at least one mechanical transmission assembly 330 may be also included in order to facilitate energy transfer between the exercise devices and the energy conversion units 170. For the particular cases of exercise bikes, the mechanical transmission assembly 330 may incorporate at least one continuously variable transmission module (also known as "stepless transmission", or "continuous ratio transmission"), which may be preferred on the basis of smoothness of operation and simplicity of adjustments.

While specific values, relationships, materials and components have been set forth for purposes of describing concepts of the invention, it will toe appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the embodiments and certain modifications of the concepts underlying the present invention, various other embodiments as well as certain variations and modifications of the embodiments herein shown and described will obviously occur to those skilled in the art upon becoming familiar with such underlying concepts. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

I claim:

1. A system comprising:
    a plurality of exercise devices, wherein each of the plurality of exercise devices comprises:
        human interfacing parts generating mechanical energy from a mechanical movement of moveable parts generated by a human participant engaging in exercise activity on the exercise device, wherein the exercise activity involves the human participant moving to further cause the mechanical movement of the human interfacing parts, and
        a generator converting the mechanical movement caused by the human participant engaging in exercise activity into storable energy, wherein the generator is integrated into the human interfacing parts of the exercise device;
    a housing, detached from the plurality of exercise devices, defining a plurality of distinct modular compartments;
    a control-power storage device oriented in the housing, coupled to the plurality of exercise devices and storing the storable energy converted from the human participant engaging in exercise activity, wherein the control-power storage device comprises:
        an assembly of rechargeable electric cells storing the storable energy oriented in a first compartment of the plurality of distinct modular compartments,
        charging stations, oriented in a second compartment of the plurality of distinct modular compartments, charging smart cellular phones using the stored energy wherein the charging stations include a rechargeable battery assembly charged using the stored energy and
    removable connectors enabling removable coupling of the assembly of rechargeable electric cells for mobile charging of electrical devices physically separate from the system; and
    a plurality of data/power couplers coupling each of the plurality of plurality of exercise devices to the modular control-power storage device.

2. The system of claim 1, wherein removable coupling of the assembly of rechargeable electric cells comprises disconnecting one or more individual rechargeable electric cells from the assembly of rechargeable electric cells in response to storing a predetermined level of storable energy converted from the human participant engaging in exercise activity.

3. The system of claim 1, wherein the plurality of exercise devices comprises one or more of: an exercise bike; an elliptical; and a cardio exercise ladder.

4. The system of claim 1, wherein the control-power storage device comprises:
    an additional storage medium storing the storable energy.

5. The system of claim 4, wherein the additional storage medium comprises at least one of: rechargeable batteries; capacitor batteries; mechanical fly wheels; energetic chemical compounds; pressurized fluid devices; elastic and elastomeric energy storage devices.

6. The system of claim 1, wherein the charging stations charge a plurality of additional electronic devices.

7. The system of claim 6, wherein the plurality of additional electronic devices comprises one or more of: portable electronic communication devices, tablets; and laptops.

8. The system of claim 1, wherein the generator is coupled to the human interfacing parts of the plurality of exercise devices using couplers.

9. The system of claim 8, wherein the couplers comprise one or more of: mechanical couplers, kinetic couplers, torque transducers, belts, chains, pulleys, gears, friction discs, pneumatic couplers, hydraulic couplers, magnetic couplers, electromagnetic couplers.

10. A system comprising:
   mobile exercise equipment, wherein the mobile exercise equipment comprises:
      a rotatable component generating mechanical energy from a mechanical movement of moveable parts generated by a human participant engaging in exercise activity on the exercise device, wherein the exercise activity involves the human participant moving to further cause the mechanical movement of the human interfacing parts; and
   a housing, detached from the plurality of exercise devices, defining a plurality of distinct modular compartments;
   a power device oriented in the housing coupled to the rotatable component of the mobile exercise device and storing storable energy converted from the human participant engaging in exercise activity, wherein the modular power device comprises:
      a generator converting the mechanical movement caused by the human participant engaging in exercise activity into storable energy oriented in a first compartment of the plurality of distinct modular compartments;
      charging stations charging smart cellular phones using the stored energy, wherein the charging stations include a rechargeable battery assembly charged using the stored energy oriented in a second compartment of the plurality of distinct modular compartments; and
   removable connectors enabling removable coupling of the modular power device for mobile charging of electrical devices physically separate from the system.

11. The system of claim 10, wherein the mobile exercise equipment comprises at least one of: an exercise bike; an elliptical; and a cardio exercise ladder.

12. A system comprising:
   a plurality of exercise devices, wherein each of the plurality of exercise devices comprises:
      human interfacing parts generating mechanical energy from a mechanical movement of moveable parts generated by a human participant engaging in exercise activity on the exercise device, wherein the exercise activity involves the human participant moving to further cause the mechanical movement of the human interfacing parts, and
      a generator converting the mechanical movement caused by the human participant engaging in exercise activity into storable energy, wherein the generator is integrated into the human interfacing parts of the exercise device;
   a housing, detached from the plurality of exercise devices, defining a plurality of distinct modular compartments;
   a control-power storage device oriented in the housing, coupled to the plurality of exercise devices and storing the storable energy converted from the human participant engaging in exercise activity, wherein the control-power storage device comprises:
      a communication and networking subsystem oriented in a first compartment of the plurality of distinct modular compartments, connecting and communicating information with a wireless network, a wired network, and a short-link radio wireless network, wherein the communication and networking subsystem communication and networking subsystem enables the system for functioning as an Internet of Things (IoT) capable device;
      an environmental control device, oriented in a second compartment of the plurality of distinct modular compartments maintaining working conditions within operating ranges of the control-power storage device and within operating ranges of the communication and networking subsystem and further maintaining environmental parameters and conditions associated with the well-being and comfort of the human participant engaging in exercise activity on the exercise device;
      a control device, oriented in a third compartment of the plurality of distinct modular compartments, providing digital and analog control of the control-power storage device;
      an assembly of rechargeable electric cells, oriented in a fourth compartment of the plurality of distinct modular compartments storing the storable energy;
      charging stations, in a fifth compartment of the plurality of distinct modular compartments, charging smart cellular phones using the stored energy, wherein the charging stations include a rechargeable battery assembly charged using the stored energy; and
   removable connectors enabling removable coupling of the assembly of rechargeable electric cells for mobile charging of electrical devices physically separate from the system; and
   a plurality of data/power couplers coupling each of the plurality of plurality of exercise devices to the control-power storage device.

13. The system of claim 12, wherein the plurality of exercise devices comprises at least a mobile exercise bike structured for remote use.

14. The system of claim 13, wherein the mobile exercise equipment device comprises at least one mobile energy storage device comprising the assembly of rechargeable electric cells.

15. The system of claim 14, wherein the mobile energy storage device is attachable to a user via a harness.

16. The system of claim 15, wherein the harness is at least one of a backpack, a waist bag, and a storage bag.

17. The system of claim 12, wherein communication and networking subsystem comprises at least one mobile communication module arranged to communicate with remote parties.

18. The system of claim 12, wherein communication and networking subsystem comprises at least one mobile communication module arranged to communicate with remote parties using electromagnetic signals emitted by an antenna.

19. The system of claim 12, wherein communication and networking subsystem comprises at least one mobile communication module arranged to communicate with remote parties using at least one of a wired transmitter, wireless transmitter, cellular connectivity device, short-link radio, Bluetooth wireless transmitter, and electromagnetic signals emitted by an antenna.

* * * * *